US007627516B2

(12) United States Patent  
Gianakouros et al.

(10) Patent No.: US 7,627,516 B2
(45) Date of Patent: Dec. 1, 2009

(54) METHOD AND SYSTEM FOR FACILITATING AUTOMATED INTERACTION OF MARKETABLE RETAIL ORDERS AND PROFESSIONAL TRADING INTEREST AT PASSIVELY DETERMINED PRICES

(75) Inventors: Nicholas P. Gianakouros, Cranford, NJ (US); David E. Shaw, New York, NY (US)

(73) Assignee: D. E. Shaw & Company, New York, NY (US)

( * ) Notice: Subject to any disclaimer, the term of this patent is extended or adjusted under 35 U.S.C. 154(b) by 568 days.

(21) Appl. No.: 11/249,495

(22) Filed: Oct. 14, 2005

(65) Prior Publication Data

US 2006/0031157 A1 Feb. 9, 2006

Related U.S. Application Data

(63) Continuation of application No. 09/565,444, filed on May 5, 2000, now Pat. No. 7,035,819.

(60) Provisional application No. 60/155,643, filed on Sep. 24, 1999.

(51) Int. Cl.
*G06Q 40/00* (2006.01)
(52) U.S. Cl. ....................................................... 705/37
(58) Field of Classification Search ............... 705/35–37
See application file for complete search history.

(56) References Cited

U.S. PATENT DOCUMENTS 6,618,707 B1 * 9/2003 Gary ......................... 705/36 R
7,162,448 B2 * 1/2007 Madoff et al. ................. 705/37

* cited by examiner

*Primary Examiner*—Hani Kazimi
(74) *Attorney, Agent, or Firm*—Kenyon & Kenyon LLP

(57) ABSTRACT

A method and system for an automated trading network that continuously collects invisible, anonymous, binding orders and indications of interest to buy and sell specific equity securities at variable, passively determined prices and, then, executes trades based on these collected orders and indications. In general, the binding orders are collected from retail broker-dealers and the binding indications are collected from institutions. The variable, passively determined, non-discrete prices can be linked to the National Best Bid or Offer (NBBO) for each security, or some other prevailing market indicator, at the time a trade is executed. In an embodiment of the method and system, marketable retail orders which match with one or more collected institutional indications, are routed from a Dynamic Order Router (DOR) at each broker-dealer to a Central Order-Match Box (COMB) to be executed against the one or more matched collected institutional indications. The COMB also manages most other aspects of transactions in the method and system and continuously executes trades against the collected institutional indications at improved prices relative to the NBBO.

37 Claims, 6 Drawing Sheets

US 7,627,516 B2

METHOD AND SYSTEM FOR FACILITATING AUTOMATED INTERACTION OF MARKETABLE RETAIL ORDERS AND PROFESSIONAL TRADING INTEREST AT PASSIVELY DETERMINED PRICES

CROSS-REFERENCE TO RELATED APPLICATIONS

This application is a continuation of U.S. patent application Ser. No. 09/565,444, filed May 5, 2000, now U.S. Pat. No. 7,035,819, which claims the benefit under 35 U.S.C. § 119(e) of U.S. Provisional Application No. 60/155,643, filed Sep. 24, 1999. U.S. patent application Ser. No. 09/565,444 is hereby incorporated by reference, as if repeated herein in their entirety, including the drawings.

FIELD OF THE INVENTION

The present invention is directed to a network for the electronic trading of financial instruments, and in particular, a system and method for automatically executing marketable retail orders against standing professional trading interest at passively determined prices.

BACKGROUND

Traders and investors who desire to buy or sell securities place orders with brokers who trade on the floor of organized stock exchanges—such as the New York Stock Exchange ("NYSE") or the American Stock Exchange ("Amex")—they send orders to over-the-counter ("OTC") market-makers trading on the NASDAQ market, and they utilize crossing networks, electronic communications networks ("ECNs"), and other electronic trading systems, such as Reuters' Instinet®, ITG Inc.'s Portfolio System for Institutional Trading (POSIT®), and Optimark Technologies, Inc.'s OptiMark™. While many exchanges and electronic trading systems offer broker-dealers and institutional investors (collectively, "institutions," "institutional investors," "institutional clients," "professional market participants," and "professional investors") the opportunity to trade, directly or indirectly, with other professional market participants, these trading venues either completely disallow or severely curtail opportunities for efficient interaction between institutional orders and many of the orders generated by retail investors. Specifically, while institutional investors participating in markets which receive retail order flow can often interact with retail non-marketable orders, the opportunity to interact with retail marketable orders either does not exist at all (for reasons identified below) or requires the manual services of a human broker, rendering the process so cost-prohibitive as to make it impractical for professional market participants interested in sustained interaction with these orders. "Retail marketable orders" consist of post-open market orders and marketable limit orders (that is, buy limit orders priced at or above the current best offer, and sell limit orders priced at or below the current best bid), which are generally executed immediately at prevailing best bids or offers. "Retail non-marketable orders" consist of all other order types—for example, pre-open orders (that is, orders entered outside normal market hours), non-marketable limit orders (that is, buy limit orders priced below the current best offer, and sell limit orders priced above the current best bid), market-on-close orders, and so forth. Retail non-marketable orders are typically not subject to immediate execution.

In the case of non-exchange-listed (that is, NASDAQ) securities, and of exchange-listed securities traded in the OTC market (that is, "Third Market" securities), both retail marketable orders and retail non-marketable orders have historically been executed by OTC market-makers acting in a principal capacity pursuant to order-routing and remuneration arrangements with retail brokerage firms, or they have been "internalized" by retail brokerage firms routing these orders to specialist or dealer affiliates which execute them in a principal capacity. Regulatory changes enacted by the Securities and Exchange Commission (SEC) in recent years have made it possible for some of these orders to interact with trading interest other than that of the market-maker or dealer to whom they were routed for execution. Specifically, the SEC now requires market-makers (as well as exchange specialists and other dealers) to (1) display certain customer limit orders in their public quotations, where they are visible to, and sometimes accessed by, other market participants, and (2) desist from "trading ahead" of unexecuted orders in their possession by buying or selling any security as principal at a price which would satisfy an unexecuted customer order in that security. However, while these regulations sometimes result in retail non-marketable orders being executed against retail marketable orders or against trading interest from other professional investors, it remains the case today that retail marketable orders received by OTC market-makers and other dealers are rarely, if ever, available for execution against the trading interest of other professional market participants.

In the case of exchange-listed securities executed on the NYSE or Amex, interaction between the large, generally block-size, orders of professional market participants (which are typically greater than 10,000 shares in size) and retail marketable orders is theoretically possible, but requires the services of a human floor broker, who must physically stand in "the crowd" at the trading post for a security on the exchange floor in order to compete with the public limit order book and other floor brokers for the opportunity to interact with incoming retail marketable orders on the opposite side of the market. It should be noted that the only strategy for interaction with retail marketable orders on the exchange floor available to professional market participants that does not require the services of a floor broker involves the placement of large, publicly displayed limit orders. Because such orders often result in highly adverse market impact to the market participant placing the orders, they are impractical as a mechanism for interaction with marketable retail orders and are therefore never utilized for this purpose. In the absence of extant or expected block-size contra trading interest by another broker, floor brokers working large orders are generally not willing to stand at a trading post on the exchange floor for an extended period solely to compete for small retail marketable orders. Thus, while it is possible in theory for a professional market participant to interact at favorable terms with individual retail marketable orders on the floor of the NYSE or Amex through the services of a human floor broker, there is currently no automated or cost-effective way to accumulate large aggregate positions over an extended period by interacting with hundreds or thousands of small retail orders.

Although they are individually small (about 600 shares in size, on average), the trades of retail investors represent a potential source of substantial aggregate liquidity—approximately 40% of total share volume in NYSE and NASDAQ issues is retail, and approximately 50% of retail orders in NYSE and NASDAQ stocks are marketable. Moreover, because the relatively small marketable orders placed by retail investors generally result in negligible market impact, or price slippage, and are typically information-less (that is, the orders are not normally motivated by informed predictions regarding short-term price movements), they are highly attractive to professional market participants as a source of liquidity for securities transactions. However, given the above described limitations on: (1) simple access to retail marketable orders (as, for example, in the case of internalized orders or orders routed to OTC market-makers for execution); and (2) efficient access to such orders where simple access is not structurally disallowed (as, for example, on the floor of the NYSE and Amex), a crossing network is needed which facilitates continuous, fully electronic, anonymous, automated, and non-display-based interaction between professional market participants and retail marketable orders. Such a network would fill an important niche not only by effectively disintermediating existing specialists and OTC market-makers for many orders (thereby giving other professional market participants the opportunity to interact directly with these retail marketable orders at favorable prices), but also by automating the otherwise prohibitively labor-intensive process of accumulating sizeable aggregate positions via a large number of small transactions with retail counterparts.

SUMMARY OF THE INVENTION

An embodiment of the present invention is directed to a computerized trading network (the "System") that collects from broker-dealers, institutions (such as pension funds and mutual funds), and other professional market participants invisible, anonymous, binding indications of interest to buy and sell specific equity securities at passively determined, non-discrete prices. In the System, the passively determined, non-discrete prices may be linked to the National Best Bid or Offer ("NBBO") for each security, or some other prevailing market indicator. In one embodiment of the present invention, these prices will always be equal to the midpoint of the current NBBO at the time of trade. In embodiments of the present invention, the System continuously routes from retail brokerage firms (collectively, "retail brokerage firms," "brokers," "brokerages," "broker-dealers," and "brokerage participants") marketable retail orders which satisfy the institutional indications to a central facility—specifically, to a Central Order-Match Box ("COMB"), which maintains a master institutional indications file, executes retail and institutional trades, and manages most other aspects of transactions on the System—where they are immediately and continuously executed against the institutional indications. This is in contrast to existing systems, such as POSIT®, which accumulate institutional trade indications only and then execute the accumulated trade indications at predetermined times. For example, POSIT® compares all of the accumulated orders to determine matches and then executes the marketable orders at set times during the trading day, that is, every hour on the hour from 10:00 AM to 3:00 PM Eastern time.

Embodiments of the present invention are expected to be very attractive both to retail brokerage firm participants and institutional clients. By interacting anonymously with generally information-less retail trading interest "upstream" of traditional execution points (that is, OTC market-makers, exchanges, ECNs, and so forth), institutions will for the first time enjoy automated electronic access to marketable retail orders, which represent an attractive new source of substantial market liquidity. In an embodiment of the present invention, both retail marketable orders and offsetting institutional indications can be executed at prices inside the quoted NBBO spread (that is, at prices between the national best bid and national best offer). In this embodiment, retail brokerage firms would, through the use of the System, provide their customers with executions evidencing, on average, a high degree of "price improvement" relative to other market centers. In addition, pursuant to a remuneration arrangement with the System sponsor, the retail brokerage firms would realize a greater portion of the intrinsic economic value of their marketable retail order flow. The impending decimalization of U.S. equity markets, which is likely to result in five-cent trading increments for most NYSE, NASDAQ, and Amex securities by Jul. 3, 2000 and penny increments by Jan. 2, 2001, will further enhance the attractiveness of embodiments of the present invention. The narrower average spreads, which should result from this transition to smaller decimal trading increments, are likely to decrease the liquidity available at the NBBO and reduce or eliminate traditional remuneration for retail order flow by Third Market and NASDAQ dealers. By facilitating access to a steady stream of retail liquidity for institutions and providing a relatively stable source of order flow remuneration for retail brokerages, embodiments of the present invention will be particularly compelling in the decimal trading environment. It should be noted that while the System is designed primarily to facilitate the continuous and immediate interaction, without waiting for set times, between institutional trading interest and retail marketable orders, the System could also permit similar continuous, immediate, automatic and fully electronic institution-to-institution crosses. These institution-to-institution crosses will generally occur at the midpoint of the NBBO whenever institutional clients willing to transact with non-retail trading interest enter two or more offsetting institutional indications.

In an embodiment of the present invention, the indications of interest are entered into the System by institutional clients and can include, for example, the following information: side (buy or sell), security symbol, number of shares, and maximum or minimum price (optional). For as long as an indication, or a residual portion thereof, is active in the System, the indication represents the submitting institution's willingness to interact with offsetting retail marketable orders (and, at the submitting institutions option, offsetting institutional indications) at the midpoint of the NBBO. This interaction would result in trades for the institution on the specified side of the specified symbol up to an aggregate quantity equal to the specified (or remaining) number of shares.

Transactions on the System are also subject to any limits specified by the submitting institution governing the maximum or minimum price at which it is willing to transact. For example, an institutional indication to buy 50,000 shares of IBM "up to" 132 ¼ signifies the submitting institution's willingness to buy up to a total of 50,000 shares of IBM at the (variable) midpoint of the NBBO, as long as it never transacts at a price greater than 132 ¼. This indication would therefore be "active" when, for example, the NBBO for IBM is 131 ⅝×131 ¾ (in which market the institution would buy from counter-parties at 131 ¹¹⁄₁₆, the market midpoint), but would be "inactive" when, for example, the NBBO for IBM is 132 ⅜×132 ½ (since the midpoint of this market, 132 ⁷⁄₁₆, exceeds the institutional indication's price limit of 132 ¼). An inactive indication present in the System would not result in any trades, just as if the indication did not exist at all. It should be noted that price limits for indications are strictly optional and they are included and specified at the sole discretion of institutional clients submitting indications. An indication submitted without an associated price limit would simply represent the submitting institution's willingness to trade at the midpoint of the NBBO (whatever this price happens to be) on the specified side of the specified symbol up to the specified number of shares. Unless explicitly indicated otherwise, all indications used in the following descriptions of various embodiments of the present invention can be assumed to be active.

Each institution can submit indications in more than one security, and can cancel or modify its unexecuted indications electronically at any time. Indications entered into the System are not displayed on any terminal or in any quotation; they are completely invisible to all System and other market participants, including, under normal operating conditions, the System sponsor. Moreover, the anonymity of institutional clients is preserved throughout the clearance and settlement process by having the System sponsor serve as counter-party for all transactions executed on the System. For example, in the case of a match between an institutional indication and a retail order, the System sponsor will always buy from the retail brokerage firm and immediately sell to the institutional investor, or vice-versa. In the case of a match between two institutional indications, the System sponsor will always buy from one institution and immediately sell to the other institution.

In an embodiment of the present invention, institutional indications are entered electronically from institutional client sites via a graphical user interface or other communications interface (collectively, Institutional Interface ("II")) connected to the COMB by communications links. For example, these communications links can include, but are not limited to, the following: leased telecommunication lines, dedicated data lines, the Internet, wireless communication systems, digital subscriber lines, radio frequencies, cable and the like. Retail orders are selectively diverted to the System for immediate execution against institutional indications through a network of specially designed hardware and software modules called Dynamic Order Routers ("DORs"), which are integrated into the internal order-handling systems of participating retail brokerage firms and connected to the COMB by communications links. The COMB dynamically updates information to all DORs regarding the symbol and side of offsetting marketable retail orders it "seeks" in order to satisfy institutional indications already resident in the System. When a DOR "sees" a retail order in a symbol/side for which the COMB has no interest, it does nothing—allowing the order to be routed to some other execution point pursuant to the brokerage firm's primary order-routing matrix. When a DOR sees a marketable retail order in a symbol and side for which the COMB does have interest, it dynamically queries the COMB for final instructions. The COMB immediately responds with instructions to (1) route the order to the System for execution against an existing institutional indication, or (2) decline the order (or do nothing), in which case the order will automatically be routed to its default execution point pursuant to the brokerage firm's primary order-routing matrix. In embodiments of the present invention, non-marketable orders are never routed to the System for execution and marketable orders are only routed to the System to satisfy existing institutional trading interest already present in the System. As a result, all retail orders routed to the System are executed immediately against one or more offsetting institutional indications. For each transaction, the System generates appropriate execution reports and transmits these to the retail and institutional parties to the transaction, as well as to a Self Regulatory Organization and other industry reporting systems for the purpose of complying with applicable trade reporting and processing procedures.

In a representative embodiment of the present invention, DOR modules can be integrated directly into the internal order-handling system of participating brokerages. The present invention is not, however, limited to such an embodiment. A participating brokerage firm might, for example, prefer to interact with the System not through a direct interface to its internal order-handling system, but rather through an interface between the System and a third-party order-routing service bureau (such as ADP or Beta Systems), ECN, or other order flow aggregator which is already routing, receiving, or otherwise processing the retail brokerage firm's orders. The present invention is intended to contemplate any such integration, which would provide the System with access to a brokerage firm's marketable retail orders.

The embodiments of the present invention are also intended to represent any crossing network which facilitates continuous (as opposed to periodic, or call-based), fully electronic, anonymous, automated, non-display-based interaction between professional market participants and retail marketable orders. In an embodiment of the present invention, in order to minimize the near-term disruption of existing business relationships between the retail brokerage firms and the OTC market-makers, exchanges, and other trading venues to which these retail brokerage firms currently route retail orders for execution, the network will divert for immediate execution on the System only those binding retail marketable orders for which the System has binding professional trading interest already in hand, that is binding indications, allowing all other retail orders to flow to other execution points. "Binding" orders and "binding" indications represent firm commitments by originating parties to trade securities, where the commitments do not require additional confirmation or approval from the originating party in order to execute a trade based on the firm commitment, as long as the binding order or binding indication remains active. The present invention is offers from originating parties to trade securities, where the offers do not require additional confirmation or approval from the originating party in order to execute a trade based on the firm offer. not, however, limited to such an embodiment, that is, to a crossing network based on selective diversion of marketable retail orders. Specifically, the present invention can be represented by any crossing network which facilitates the interaction of retail marketable orders and professional trading interest in a manner substantially similar to one described in this application. Therefore, the present invention contemplates covering OTC market-maker, ECN, national or regional stock exchange, or other execution point systems which allow professional market participants to interact immediately, continuously, electronically, anonymously, automatically, and without display of their trading interest, with retail marketable orders routed to that execution point. For example, one contemplated embodiment of the present invention involves a system for an OTC market maker that matches incoming retail marketable orders with third-party institutional orders in a manner substantially similar to that described in this application. This system allows the market-maker to collect risk-free commission revenue (from institutional clients) for any institutional shares executed against retail order flow in this manner, while handling non-matched marketable retail orders in the traditional manner (that is, interacting them with offsetting limit orders on the market-maker's book, and/or committing capital to execute them as principal). It should be noted that such an embodiment of the present invention would not require any selective diversion of retail order flow to the system. This is because retail brokerages would already be routing orders (using traditional, static order-routing criteria such as symbol, order size, and order type) to the OTC market maker for execution.

DETAILED DESCRIPTION

The present invention is described below in the context of trading equity securities. However, the invention is not so limited and can be easily adapted to allow the trading of other liquid assets such as options, bonds, derivatives, and the like. Accordingly, where the context permits, the terms "securities," "stock," and "shares" when used herein includes other instruments that can be traded, such as, for example, options, bonds, and derivatives. The terms "buy" and "sell" include, where appropriate, bid and offer, etc.

In embodiments of the present invention, intended users of the System are typically, on the one hand, professional investors, such as institutional investors (for example, a pension fund manager), market makers, and the institutional agency and/or proprietary trading desks of broker-dealers, and on the other hand retail brokerage firms. As used herein, the term "institution" (and all other equivalent terms as defined in the Background section of this application) refers to any non-retail person or entity that wishes to make a trade and "retail brokerage" means any source of retail orders.

Figure 1:
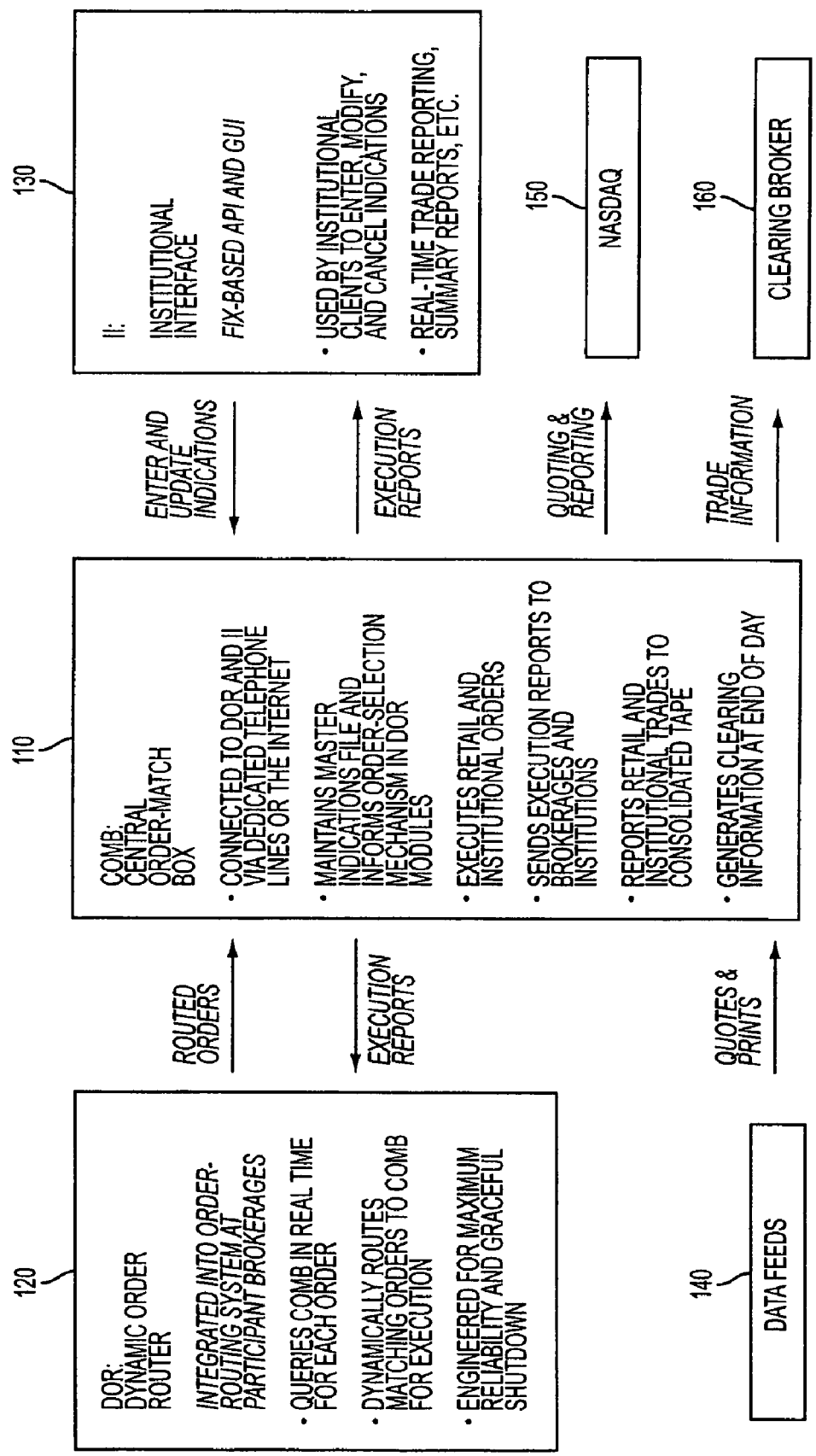
FIG. 1 illustrates a functional block diagram of the overall architecture for a crossing network in accordance with an embodiment of the present invention.

Referring now to the drawings, FIG. 1 illustrates a functional block diagram of the overall architecture for a crossing network in accordance with an embodiment of the present invention. A Central Order Match Box ("COMB") 110 executes retail orders and institutional indications transmitted to the COMB 110 from various retail brokerage firms and institutional investors. In an embodiment of the present invention, retail orders are selectively routed to the COMB 110 by Dynamic Order Routers ("DOR") 120 integrated into the internal order-handling system of participant brokerage firms and connected to the COMB 110 via, for example, leased telephone lines, the Internet or other suitable communications system (not shown). Institutional Interface ("II") 130 software allows institutional investors to submit, modify, and cancel indications on the System, as well as to receive trade and other status reports from the COMB 110. IIs 130 are similarly connected to the COMB 110 via communication links, such as, leased telephone lines, the Internet or other suitable communications system (not shown). In an embodiment of the present invention, II 130 is implemented as a Financial Information Exchange ("FIX")-based application programming interface ("API") and/or a graphical user interface ("GUI") for use by the institutional investors.

In an embodiment of the present invention, the COMB 110 maintains master indications file and uses this to inform the order-selection mechanism in each of the DOR modules. In this embodiment of the present invention, the COMB 110 automatically matches and then executes retail orders received from the DORs 120 and institutional indications received from the IIs 130. In embodiments of the present invention, matching involves pairing a retail order with at least one opposite side institutional indication for each security, where for example, an opposite side match would be defined by a buy order with a sell indication for a stock A or a sell order with a buy indication for the stock A. Matching can also involve pairing two or more opposite side institutional indications for each security. These trades are executed using information received from data feeds 140, which provide real time quotes, last sale, and other trading information for each security being traded on the System. Following the execution of each order, the COMB 110 sends execution reports to the brokerages and institutions involved in the order and then reports the retail and institutional trades to the relevant stock market consolidated tapes, for example, NASDAQ 150.

Figure 2:
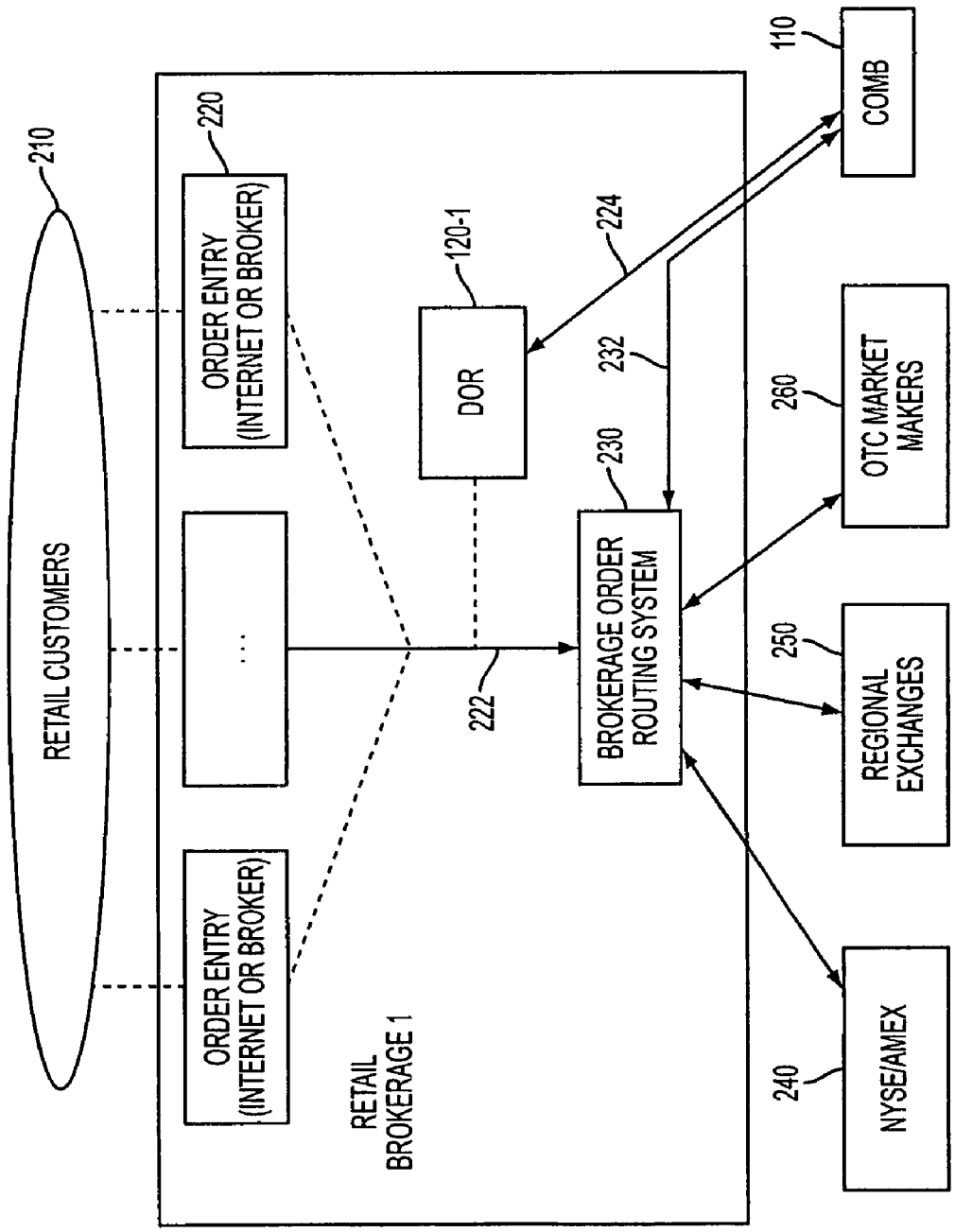
FIG. 2 is a system diagram illustrating how the present invention might interface with a retail brokerage firm.

FIG. 2 illustrates a system diagram of the order-handling and order-routing systems of a representative retail brokerage firm in accordance with the present invention. In FIG. 2, a plurality of retail customers 210 are illustrated as being connected to a plurality of order entry modules 220 at a representative retail brokerage firm. The order entry modules 220 can be implemented as either an Internet or similar electronic connection or as a human broker who can manually receive retail orders from the retail customers 210 and then forward the orders on to the brokerage firm's order routing system 230. In an embodiment of the present invention, an individual DOR module 120-1 is illustrated connected to the COMB 110 via a connection 224 to dynamically send and receive data from the COMB 110. The DOR module 120-1 is also connected to the brokerage's retail order stream 222 for the purpose of instructing that certain orders be routed to the COMB 110 for execution, either directly via the DOR 120-1 and connection 224, or indirectly via the order routing system 230 and a separate connection 232. In an embodiment of the present invention, one method of implementing the direct routing is for the DOR module 120-1, using instructions from the COMB 110; to selectively route orders from the retail order stream 222 to the COMB 110 for execution via connection 224. In this case, the order selected for routing to the COMB 110 can be diverted from the retail order stream 222 to the COMB 110, and therefore would not continue on to the brokerage order-routing system 230. Upon receipt of the diverted retail order, the COMB 110 would immediately execute the trade and return an execution report to the retail brokerage via the same connection 224. In another embodiment of the present invention, the direct routing method can be implemented by programming the retail brokerage order routing system 230 to route all retail orders, or all retail marketable orders, to the COMB 110 via connection 232, irrespective of whether offsetting institutional indications are present in the COMB 110. In this embodiment, the COMB 110, which would receive a much larger number of orders, would selectively and immediately execute those retail orders for which it has offsetting institutional indications, and transmit execution reports for these orders back to the brokerage order routing system 230 via connection 232. Those orders received by the COMB 110 for which the COMB 110 does not possess offsetting institutional indications would be immediately and automatically routed back to the brokerage order routing system 230 via connection 232, or a separate communications link (not shown), for routing by the brokerage order routing system 230 to other execution points including national exchanges 240, regional exchanges 250, and OTC market-makers 260. In this embodiment, the retail brokerage order-routing system 230 would be programmed to initially route all retail orders, or all retail marketable orders, to the COMB 110 for review and selective execution, and to route all orders returned to it from the COMB 110 to the alternative execution points for execution, as indicated above. By incorporating the order-selection mechanism within the COMB 110, this method of direct routing does not require a separate DOR module 120-1 or the associated communications link 224.

In another embodiment of the present invention, one method of implementing the indirect routing is for the DOR module 120-1, using instructions from the COMB 110, to selectively "tag" certain orders (for example, by entering a special character in the order string, or otherwise modifying a field in the order's message format) for routing to the COMB 110. The DOR module 120-1 is generally connected to the input retail order stream 222 prior to the brokerage order routing system 230 in order to tag the selected orders before they enter the brokerage order routing system 230 and receive default routing assignments to alternative execution points. The internal brokerage order routing system 230 can be modified to route all "tagged" orders to the COMB 110 via connection 232 for execution. Untagged orders are always routed by the brokerage order routing system 230 to alternative execution points, such as, national stock exchanges 240, regional exchanges 250, and OTC market-makers 260, pursuant to existing business relationships between participant brokerages and those other execution points. The COMB 110 immediately executes any orders it receives and sends trade reports back to the originating brokerage firms via the same communications link. In an embodiment of the present invention which incorporates indirect routing, the DOR 120-1 has an associated DOR "interest list" (not shown), which can list, for example, the symbol and side of marketable retail orders the COMB 110 seeks for execution against institutional indications already resident in the System. The interest list can be updated dynamically by the COMB 110 as trades are executed. In an embodiment of the present invention, the DOR 120-1 compares each retail order from the input retail order stream 222 with the DOR interest list. A potential match exists when, for example, a retail marketable sell order for security XYZ is received and a sell XYZ entry exists on the DOR interest list (reflecting the presence of an institutional buy indication in XYZ in the COMB 110). If a potential match is found, the DOR 120-1 immediately queries the COMB 110 for final instructions on how to proceed with regard to this order via the connection 224. The COMB 110 responds via the connection 224 with final instructions to, for example, "tag" the retail order to be transmitted to the COMB 110. In this case, the tagged retail order continues to the brokerage order routing system 230 where it is routed to the COMB 110 via the connection 232. Once the COMB 110 receives the tagged retail order, the tagged retail order is immediately executed against an offsetting institutional indication. A report of the executed trade is then transmitted back to the brokerage order routing system 230 via connection 232.

In other embodiments of the present invention, the COMB 110 may be connected to a series of DOR modules 120-1 through 120-*n* at various retail brokerage firms, as well as to a series of institutional clients using IIs 130-1 through 130-*m* to submit orders. A high-level view of this constellation of participants is illustrated in FIG. 3A.

Figure 3A:
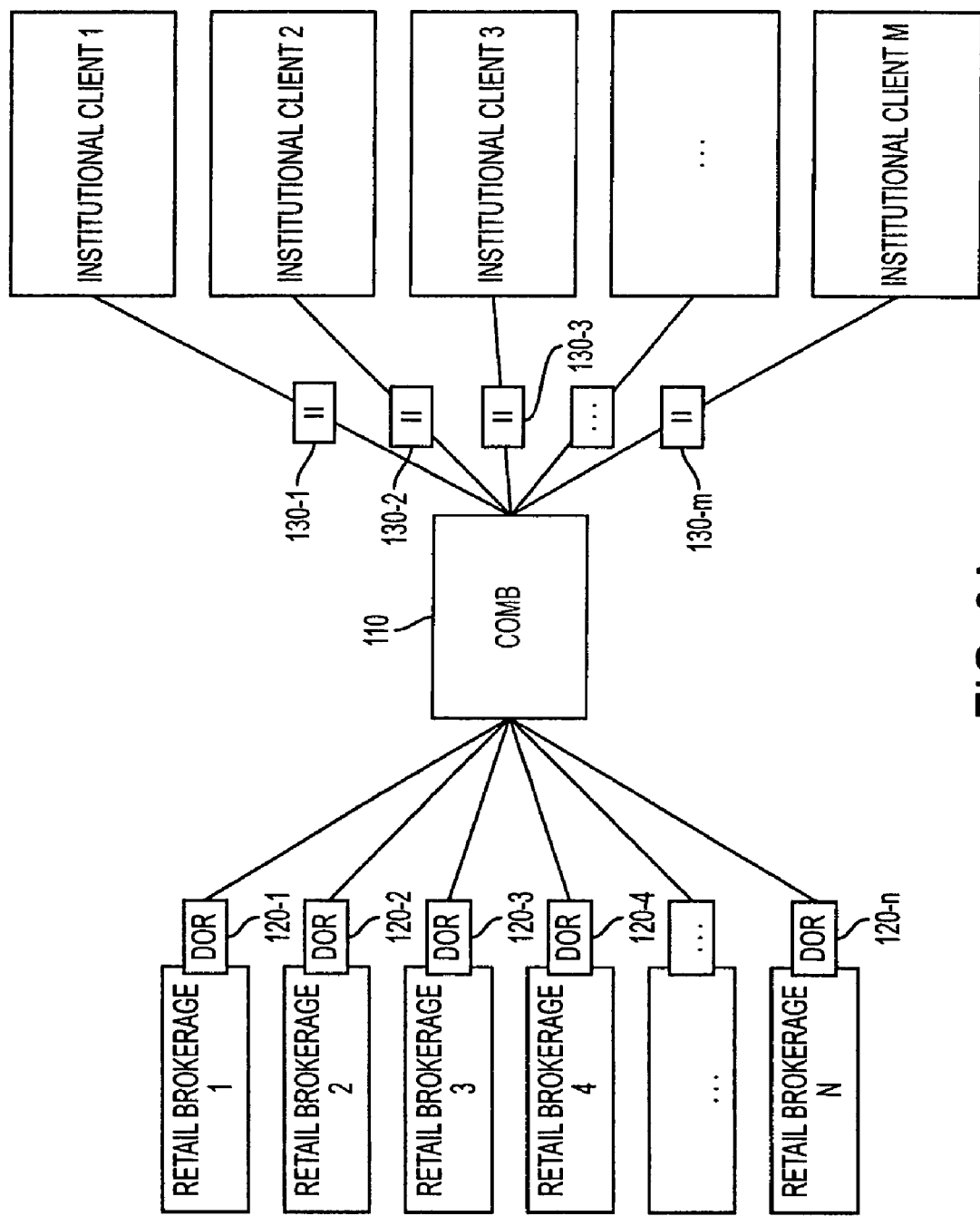
FIG. 3A is a high-level diagram illustrating the interrelationship between the present invention and a series of retail brokerage and institutional participants.

FIG. 3A is a high-level diagram illustrating the interrelationship between the present invention and a series of retail brokerage and institutional participants. In this embodiment, the COMB 110 is connected through a plurality of communications links to a plurality of DOR modules 120-1 through 120-n at different retail brokerages 1 through N. Likewise, COMB 110 is connected through a plurality of communications links to a plurality of II modules 130-1 through 130-m at different institutional clients 1 through M.

In an embodiment of the present invention, institutional clients will utilize the II 130 (for example, a FIX-protocol-based Application Programming Interface or Graphical User Interface) to communicate with the COMB 110. The II 130 is used to enter, modify, and cancel indications, and serves as the mechanism used by the COMB 110 to communicate various trade and status reports to institutional clients. Through possible business arrangements with other trading system, data, and technology vendors, third-party terminals or electronic interfaces may also be used by institutional clients to communicate with the COMB 110. Indications entered into the COMB 110 by institutional clients will be completely invisible to all other System clients and market participants. These indications will not be displayed on any screen, terminal, or quotation, or otherwise communicated to any person or entity (excepting, of course, for an institutional client's ability to view its own indications in the COMB 110) in any way. In the normal course of business, these indications will also not be viewed by the staff and associated persons of the System sponsor. In the event of a force majeure or other special situation, however, System technical staff may be required to view some indications for the purpose of assessing or remedying a technology or operational failure, in which case robust business policies and procedures will serve to protect the confidentiality of institutional information present in the System. Since the System sponsor will serve as counterparty on both sides of every trade executed on the System (that is, execute the retail order as a riskless principal and simultaneously trade as a riskless principal against the institutional indication), the anonymity of institutional clients will be preserved throughout the clearance and settlement process.

While trades on the System will be reported to the consolidated tape, it will be impossible for any outside observers or "downstream" execution points to determine the number, size, or price boundaries of institutional indications present in the System. At best, this reporting will sometimes make it possible, depending on the specific execution-price protocol embodied in the System, for a motivated observer utilizing sophisticated techniques to deduce the existence of a buy or sell indication on the System in a particular security. Since information regarding the mere existence of a professional buyer or seller in a given stock is often available today via floor brokers, upstairs brokers, and electronic indication systems such as AutEx, it is extremely unlikely that potential front-runners will find this information to be of much proprietary trading value. Moreover, the passive nature and "slow but steady" pace of institutional trading on the System may appeal primarily to market participants who are not trading on a short-term time horizon—a fact which further erodes the value of available information to potential front-runners. It is therefore highly likely that representative embodiments of the present invention will provide the degree of anonymity and invisibility institutional clients require and, thus, prevent front running of their block-size trading interests. "Front-running" occurs when a third party who has learned of a large (unexecuted) institutional order to buy or sell immediately transacts on the same side of the same security for its own account in an effort to capitalize on the expected price appreciation or depression which will result from execution of the larger institutional order. In the process, the front-runner's order results in price slippage, which is detrimental to the institutional investor.

Figure 3B:
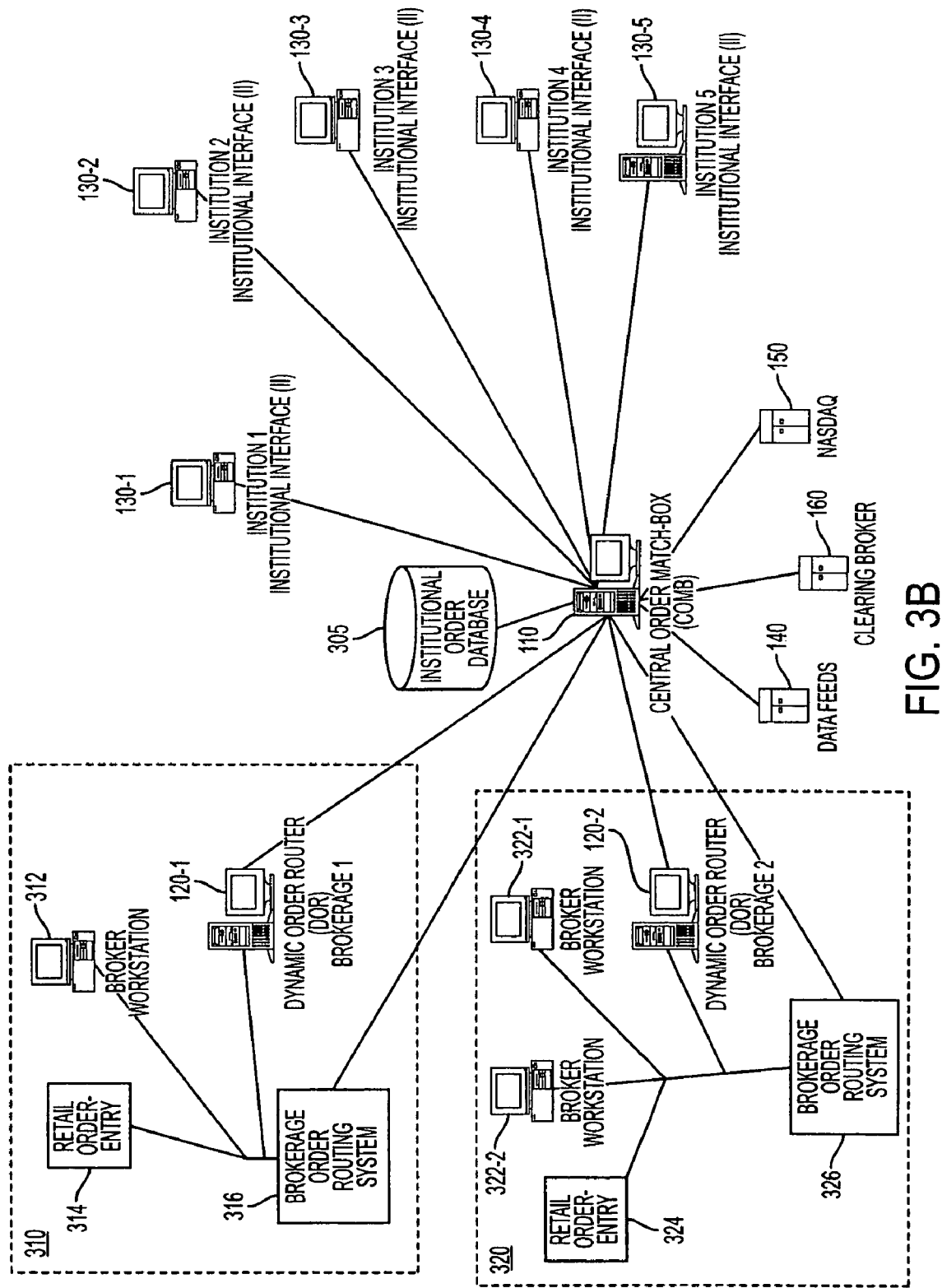
FIG. 3B shows one embodiment of the interrelationship between the present invention and a series of retail brokerage and institutional participants.

FIG. 3B illustrates an embodiment of the present invention in which two different retail brokerages and five different institutions are connected to the COMB 110. In FIG. 3B, the COMB 110 includes an institutional order database 305, which stores the pending and partially completed institutional indications in a master indications file, which is compiled from indications received through the connections to the IIs at institutions 130-1, 130-2, 130-3, 130-4 and 130-5, respectively. The COMB 110 is implemented as a distributed software system running either on a single computer or a networked set of computer systems, which could be either server platforms or workstations using standard personal computer (PC) technology. For example, a computer hosting a software application that comprises a piece of the COMB 110 may be a Sun® dual-processor UltraSPARC™-II-based server operating at 450 MHz and with 512 to 4096 Megabytes (MB) of random access memory (RAM); a mass memory storage unit, such as a floppy disk, a zip disk, a DVD disk, a hard disk drive, a rewritable optical disk, a flash memory or other non-volatile storage device; and sufficient communication capabilities to connect the COMB 110 to each of the individual DOR 120, II 130 and other components.

In another embodiment of the present invention illustrated in FIG. 3B, the computer hosting the software application that comprises a piece of the COMB 110 may be an Intel® Pentium®-based PC operating at 500 MHz and with 128 to 512 MegaBytes (MB) of random access memory (RAM); a mass memory storage unit, such as a hard disk drive; and sufficient communication capabilities to connect the COMB 110 to each of the individual DOR 120, II 130 and other components.

Figure 4:
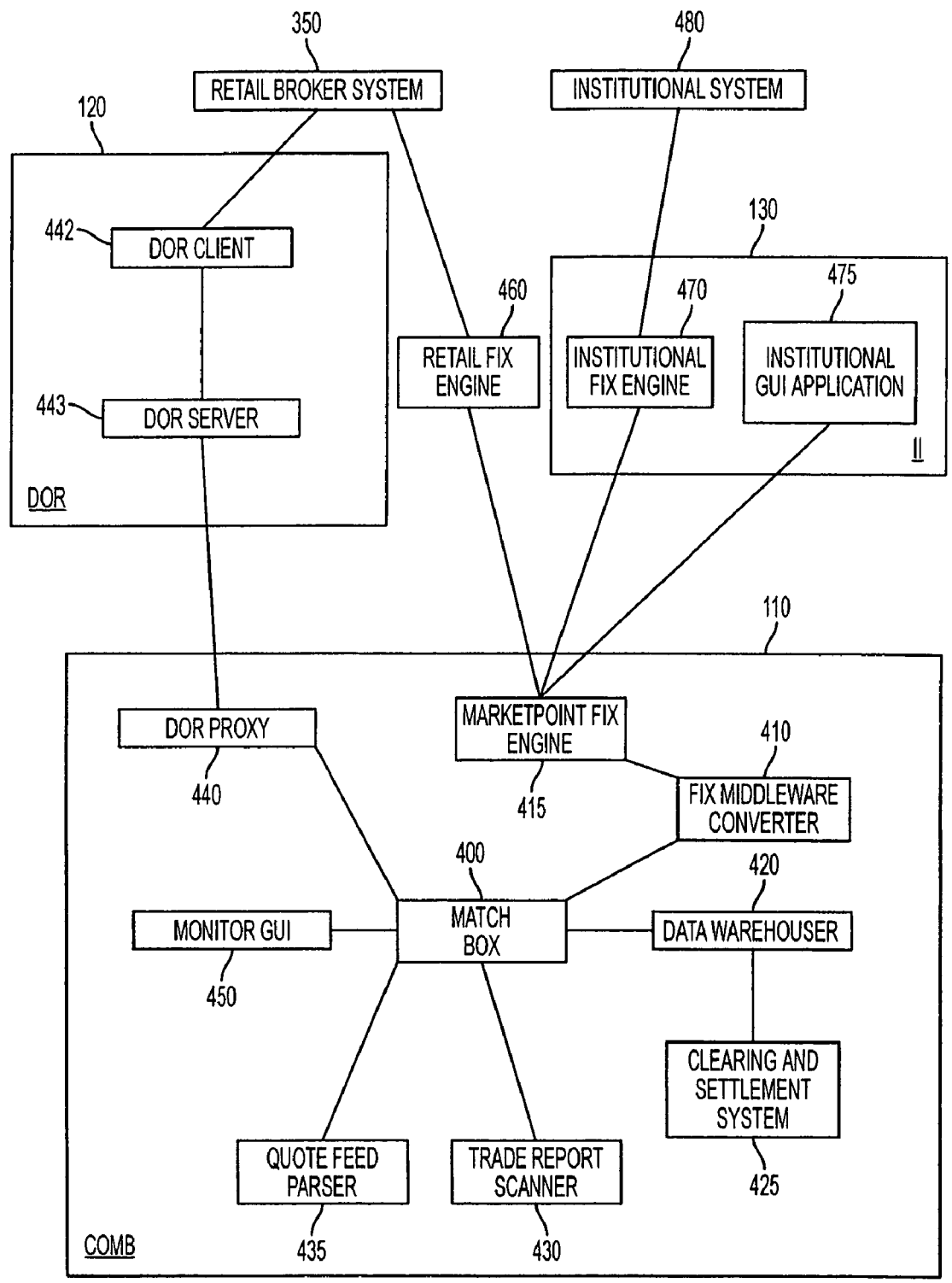
FIG. 4 is a system diagram of a representative embodiment of the present invention detailing individual software, hardware, and other technology sub-components in accordance with an embodiment of the present invention.

FIG. 4 illustrates a functional system diagram of an embodiment of the present invention which details individual software, hardware, and other technology sub-components in accordance with an embodiment of the present invention. In FIG. 4, COMB 110 includes one or more Match Box components 400, which can manage institutional and retail orders and execute these orders against each other. The Match Box component 400 is connected to: 1) a FIX Middleware Converter 410 which is, in turn, connected to a MarketPoint FIX engine 415; the FIX Middleware Converter 410 is a software module that can convert messages back and forth between the language spoken by the Match Box 400 and the language spoken by the MarketPoint FIX engine 415; the MarketPoint FIX Engine 415 can maintain a network connection to multiple Retail FIX engines 460 and Institutional FIX engines 470 and exchange orders, execution reports, and related messages in the FIX language with these other FIX engines; 2) a Data Warehouser component 420 which is, in turn, connected to a Clearing and Settlement System 425; the Data Warehouser 420 can store all information related to orders executed or otherwise handled by the COMB 110; the Clearing and Settlement System 425 can transmit clearing and settlement data to the clearing broker and prepare periodic trade summary reports for System customers and regulators; 3) a Trade Report Scanner 430; the Trade Report Scanner 430 can perform Automated Confirmation of Transactions (ACT)-reporting duties and handles other real-time trade reporting requirements; 4) a Quote Feed Parser 435; the Quote Feed Parser 435 is connected to several external real time data feeds (such as those offered by Reuters, Bridge, or Bloomberg, for example) and can capture quote and transaction data (such as the NBBO, last trade, etc.) which it can then transmit to the Match Box 400; 5) a DOR Proxy 440; the DOR Proxy 440 maintains the state of connections (such as "live" or "dead") from the retail broker DOR Server modules and relay messages between the Match Box and the DOR Server applications; and 6) a Monitor GUI 450, which can be used to examine the state (such as "live" or "dead") of applications in the system, manually enter orders or executions into the Match Box, and correct orders or fills already known to the Match Box when an error occurs.

In FIG. 4, the DOR 120 includes one or more DOR Server applications 443, each of which is connected to one or more DOR Client instances 442. Each DOR Server 443 is externally connected to the COMB 110 by way of the DOR Proxy 440. The DOR Client 442 is also connected, outside of the DOR 120, to at least one Retail Broker System 316, which is, in turn, connected to a Retail FIX Engine 460 which is connected to the MarketPoint FIX Engine 415. The DOR Client 442 sees every retail order flowing through a brokerage's internal order-handling system (part of Retail Broker System 316) and, for each order, queries the DOR Server 443 regarding the possibility of a potential match. The DOR Server 443 maintains a local institutional indication list (the "interest list") and, using the contents of this interest list, decides in real time whether a potential match exists for any order for which it receives a query from the DOR Client 442. If no potential match exists, the DOR Server 443 immediately instructs the DOR Client 442 to decline the subject order. Alternatively, if no potential match exists, the DOR Server 443 can do nothing, which also results in the subject order being automatically declined. When the DOR Server 443 receives a query from the DOR Client 442 regarding an order for which a potential match exists, it immediately queries the COMB 110 for final instructions concerning the subject order. If the COMB responds with instructions to accept the subject order, the DOR Server 443 will transmit this instruction to the DOR Client 442 which originally submitted the query for the subject order. The DOR Client 442, which is integrated into the retail brokerage's order-handling system, would then flag the subject order by informing the Retail Broker System 316 that the order should be routed to the System for execution. The Retail Broker System 316 represents the internal order-handling and order-routing system of a retail brokerage firm that participates in the System. When the Retail Broker System 316 is informed by the DOR Client 442 that the subject order should be routed to the System, it passes this information to the Retail FIX Engine 460. The Retail FIX Engine 460 then transmits the order in the FIX language to the COMB 110. If the COMB 110 responds with instructions to decline the subject order, the DOR Server 443 transmits these instructions to the DOR Client 442 or, alternatively, the DOR Server 443 can do nothing, in which case the subject order is also automatically declined. In this case, when the subject order is declined, the subject order is routed to another market center for execution based on the brokerage firm's primary order-routing matrix.

In FIG. 4, II 130 is connected to the MarketPoint FIX Engine 415. Institutional System 480 is connected to the Institutional FIX Engine 470, which is also connected to the MarketPoint FIX Engine 415. The Institutional GUI Application 475 is software with a graphical interface that allows traders at participating institutions to manually enter, view, or modify orders entered into the System by their firm. The Institutional System 480 is the internal order routing and management system of an institutional client of the System.

In an another embodiment of the present invention, as an alternative to the Institutional GUI Application 475, the Institutional FIX Engine 470 can automatically transmits orders directly from the institution to the COMB 110 using existing institutional order routing and management software that is used by traders of the institution.

Figure 5:
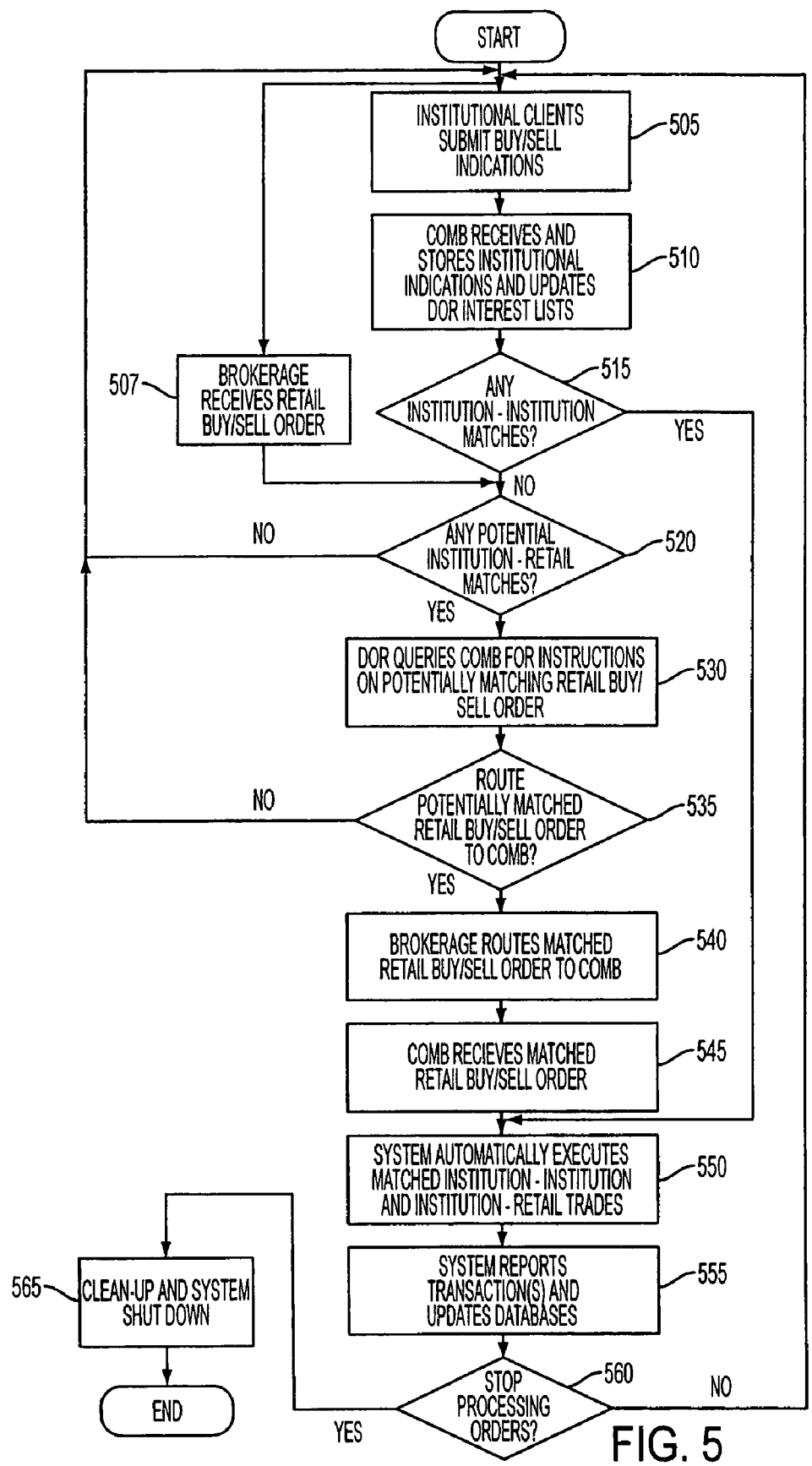
FIG. 5 is a flow chart diagram illustrating the operation of the overall system process by which institutional order indications and retail orders are matched and executed in a central order match box (COMB) in accordance with an embodiment of the present invention.

FIG. 5 is a flowchart that describes the operation of the overall system by which retail and institutional orders are matched and executed in accordance with an embodiment of the present invention. In FIG. 5, in block 505 institutional clients submit one or more buy and sell indications in one or more securities. In block 510, the COMB receives and stores the institutional indications and updates the DOR interest lists. In block 515 a check is made to determine if any institution-to-institution matches exist and, if so, flow continues with block 550 described below. In block 507, a participating brokerage receives buy and sell orders from retail clients, either before, concurrent with, or after blocks 505, 510, and 515. If no institution-to-institution matches are found in block 515, then in block 520 a check is made to determine if the DOR has any potential matches among retail orders it has seen and compared to its local interest list. If there is a potential match, then in block 530 the DOR queries the COMB for final instructions regarding the potentially matching retail order. In block 535 the COMB responds to the DOR with instructions to route the potentially matching retail order to the COMB, in which case flow continues with block 540, or it responds with instructions to decline the retail order (or fails to respond at all), in which case flow continues with block 505 as described above. If any potentially matching retail orders are affirmatively accepted by the COMB in block 535, then in block 540 the brokerage order routing system routes the matched matching retail order to the COMB. In block 545, the COMB receives the retail order and immediately and automatically executes the retail order against one or more offsetting institutional indications in block 550. Following the execution of trades in block 550, in block 555 the COMB reports the transactions to the consolidated tape and to the originating retail brokerage firm and institutional client(s) which were parties to the transaction, and updates the databases at the COMB and, as appropriate, at each connected DOR to reflect the results of the executed trade. In block 560 a check is made to determine if the COMB should stop processing orders and, if not, then the flow continues with block 505 as described above. If, in block 560, it is determined that the COMB is to stop processing orders, then in block 565 the COMB performs a system clean up and shuts down the system.

Although a variety of execution-price protocols are possible, in one embodiment of the present invention, one quarter of the NBBO spread for each retail share executed on the System against an institutional indication will accrue to the end retail investor in the form of "guaranteed" price improvement (that is, retail investors whose orders are executed on the System would always buy at a price ¼ spread lower than the national best offer and sell at a price ¼ spread higher than the national best bid), and that another quarter of the NBBO spread will accrue to the originating retail brokerage firm pursuant to a revenue-sharing arrangement. The remaining 50% of the NBBO spread will always go to the institutional client in the form of a midpoint execution. The System will generate proprietary revenue (which is not expected to be re-distributed to brokerage partners as order flow remuneration) by charging these institutional clients a per-share commission for trades on the System.

This distribution of the NBBO spread, in accordance with an embodiment of the present invention, is illustrated in the following example:

EXAMPLE 1

| | |
|---|---|
| NBBO: | IBM 131⅝ × 131¾ (spread = ⅛) |
| RETAIL ORDER: | SELL 500 IBM MKT |
| INSTITUTIONAL INDICATION: | BUY 50,000 IBM up to 132¼ |
| RETAIL EXECUTION: | SLD 500 IBM @ 131²¹⁄₃₂ (price improved by ¼-spread, or $\frac{1}{32}^{nd}$) |
| INSTITUTIONAL EXECUTION: | BOT 500 IBM @ 131¹¹⁄₁₆ (market midpoint) |
| BROKERAGE REMUNERATION: | ¼-spread, or 3.125 cents/share |

The process involved in executing the Example 1 transaction is provided in Table 1.

TABLE 1

1: Institutional client submits the following indication to the System via an II.
    BUY 50,000 IBM, up to 132¼
(Assume that NBBO for IBM is 131⅝ × 131¾ and that this is the only indication in any symbol present in the System.)
2: The indication is received by the COMB, which updates its internal "master file" of indications to reflect the existence of this new indication.
3: The COMB simultaneously updates its "interest list" at all DOR modules to instruct that they query the COMB whenever they "see" marketable SELL orders in IBM.
4: DOR modules "see" retail orders in other symbols, orders to BUY IBM, and non-marketable orders to SELL IBM. DORs do not query the COMB for any of these orders, which are routed, untouched by DORs, to other execution points (e.g., the NYSE, regional exchanges, OTC market-makers, etc.) pursuant to existing business relationships between participant brokerages and those execution points.
5: A DOR module "sees" the following marketable SELL order in IBM:
    SELL 500 IBM MKT
6: The DOR module instantaneously queries the COMB for instructions regarding whether to route this order to the System for execution, either directly or by "tagging" the order for routing through the brokerage's order-routing system. Assume for purposes of this discussion that the "tagging" methodology is used.
7: The COMB receives this query, checks its master file of indications to confirm that there is an active indication to BUY IBM, and immediately responds to the DOR with instructions to tag the retail order for routing to the COMB.
8: The DOR module tags the order (by inserting a special character or otherwise modifying its message string) for routing to the COMB.
9: The tagged order flows through the order-routing system of the participant brokerage firm, which "reads" the tag and routes the order to the COMB for execution.
10. The COMB receives the retail order, and immediately executes it against the offsetting indication as follows:
    Retail Execution:    SOLD 500 IBM 131²¹⁄₃₂ (price improved by ¼-spread, or $\frac{1}{32}^{nd}$)
    Institutional Execution:    BOT 500 IBM 131¹¹⁄₁₆ (market midpoint)
11: The COMB sends execution reports to both the retail brokerage firm and the institutional client. It also immediately reports the trades to the consolidated tape and updates all internal databases (including its clearance and settlement files) to reflect the transaction. It also "credits" the originating brokerage with ¼ of the spread for this trade in order flow remuneration ($\frac{1}{32}^{nd}$ × 500 shares = $15.625).
12: The COMB immediately decrements the size of the institutional indication (to: BUY 49,500 IBM, up to 132¼) to reflect the trade, and updates (as needed) its "interest list" at all DOR modules.

While the distribution of price improvement will be different for orders executed on the System than for orders executed at traditional market centers, it is believed that brokerage firms and regulators will view the System favorably if its average price improvement per share (the most pertinent indicator of execution quality for retail orders) compares favorably with that of other execution points. It is expected that the System will achieve such favorable average price-improvement results, and that these will persist, (again, relative to other markets) when spreads narrow as a result of the move to decimal pricing.

In an embodiment of the present invention, a method for the continuous buying and selling of securities includes receiving a plurality of active binding indications to trade securities at non-discrete prices from at least one institution, where each of the active binding indications to trade securities is a non-retail order to trade and the non-discrete prices are determined using national best bid and offer (NBBO) data. The method further includes storing the plurality of active binding indications to trade securities and executing an institution-to-institution trade defined by a first of the plurality of active binding indications to trade securities and a second of the plurality of active binding indications to trade securities immediately upon receipt of the second of the plurality of active binding indications to trade the security, if the second of the plurality of active binding indications to trade the security is on an opposite side of the first of the plurality of active binding indications to trade the security and the first and second of the plurality of active binding indications to trade securities are from different institutions, wherein the institution-to-institution trade is executed so that each of the first and second active binding indications to trade are anonymous as to a source of the indication and also invisible to all other market participants. The method further includes transmitting information on the plurality of active binding indications to trade securities at non-discrete prices to at least one source of binding orders and receiving at least one query from at least one of the at least one source of binding orders to request an instruction regarding one of the plurality of active binding indications to trade securities. The method further includes transmitting the instruction to the at least one of the at least one source of binding orders, the instruction being to transmit a binding order to trade securities, if the binding order is an opposite side binding order to trade securities which is on an opposite side of the one of the active binding indications to trade securities, or decline the binding order to trade securities. The method further includes receiving the opposite side binding order to trade securities from the at least one source of binding orders, if the instruction was to transmit the opposite side binding order to trade securities, and executing an institution-to-retail trade defined by the one of the plurality of active binding indications to trade securities and the opposite side binding order to trade securities immediately upon receipt of the opposite side binding order to trade securities, wherein the institution-to-retail trade is executed so that the one of the plurality of active binding indications to trade and the opposite side binding order to trade are anonymous as to a source of both the indication and the order and also invisible to all other market participants.

In an alternate embodiment of the previous invention, instruction to transmit the binding order to trade in the previous embodiment includes instructions to either directly route the binding order to trade; or tag the binding order to trade to be subsequently routed by a primary order routing system and forward the tagged binding order to trade to the primary order routing system to be routed.

In another embodiment of the present invention, a method for the continuous buying and selling of securities includes receiving a plurality of active binding indications to trade securities at non-discrete prices from at least one institution, where each of the active binding indications to trade securities is a non-retail order to trade and the non-discrete prices are determined using national best bid and offer (NBBO) data and storing the plurality of active binding indications to trade securities. The method further includes executing at least one institution-to-institution trade defined by a first of the plurality of active binding indications to trade securities and a second of the plurality of active binding indications to trade securities immediately upon receipt of the second of the plurality of active binding indications to trade securities, if the second of the plurality of active binding indications to trade securities is on an opposite side of the first of the plurality of active binding indications to trade securities and the first and second of the plurality of active binding indications to trade securities are from different institutions, wherein the at least one institution-to-institution trade is executed so that each of the first and second active binding indications to trade are anonymous as to a source of the indication and also invisible to all other market participants. The method further includes receiving at least one binding order to trade securities from at least one source of binding orders and executing at least one institution-to-retail trade defined by one of the plurality of active binding indications to trade securities and one of the at least one binding order to trade securities immediately upon receipt of the one of the at least one binding order to trade securities, if the one of the at least one binding order is an opposite side binding order to trade securities which is on an opposite side of the one of the plurality of active binding indications to trade securities. The method further includes transmitting each unexecuted binding order to trade securities back to the source of the unexecuted binding order to trade securities.

In another embodiment of the present invention, a method for the continuous buying and selling of securities includes receiving a plurality of active binding indications to trade securities at non-discrete prices from at least one institution, where each of the active binding indications to trade securities is a non-retail order to trade and the non-discrete prices are determined using national best bid and offer (NBBO) data and storing the plurality of active binding indications to trade securities. The method further includes executing at least one institution-to-institution trade defined by a first of the plurality of active binding indications to trade securities and a second of the plurality of active binding indications to trade securities immediately upon receipt of the second of the plurality of active binding indications to trade securities, if the second of the plurality of active binding indications to trade securities is on an opposite side of the first of the plurality of active binding indications to trade securities and the first and second of the plurality of active binding indications to trade securities are from different institutions, wherein the at least one institution-to-institution trade is executed so that each of the first and second active binding indications to trade are anonymous as to a source of the indication and also invisible to all other market participants. The method further includes receiving at least one binding order to trade securities from at least one source of binding orders and executing at least one institution-to-retail trade defined by one of the plurality of active binding indications to trade securities and one of the at least one binding order to trade securities immediately upon receipt of the one of the at least one binding order to trade securities, if the one of the at least one binding order is an opposite side binding order to trade securities which is on an opposite side of the one of the plurality of active binding indications to trade securities. The method further includes transmitting each unexecuted binding order to trade securities to one of an exchange, a market maker, an electronic communications network (ECN), an alternative trading system (ATS), and any other market center.

In another embodiment of the present invention, a method for the continuous buying and selling of securities includes receiving a plurality of active binding indications to trade securities at non-discrete prices from at least one institution, where each of the active binding indications to trade securities is a non-retail order to trade and the non-discrete prices are determined using national best bid and offer (NBBO) data and storing the plurality of active binding indications to trade securities. The method further includes executing at least one institution-to-institution trade defined by a first of the plurality of active binding indications to trade securities and a second of the plurality of active binding indications to trade securities immediately upon receipt of the second of the plurality of active binding indications to trade securities, if the second of the plurality of active binding indications to trade securities is on an opposite side of the first of the plurality of active binding indications to trade securities and the first and second of the plurality of active binding indications to trade securities are from different institutions, wherein the at least one institution-to-institution trade is executed so that each of the first and second active binding indications to trade are anonymous as to a source of the indication and also invisible to all other market participants. The method further includes receiving at least one binding order to trade securities from at least one source of binding orders and executing at least one institution-to-retail trade defined by one of the plurality of active binding indications to trade securities and one of the at least one binding order to trade securities immediately upon receipt of the one of the at least one binding order to trade securities, if the one of the at least one binding order is an opposite side binding order to trade securities which is on an opposite side of the one of the plurality of active binding indications to trade securities. The method further includes transmitting each unexecuted binding order to trade securities to an order routing service bureau or similar entity for routing to an exchange, a market maker, an electronic communications network (ECN), an alternative trading system (ATS), or any other market center.

In another embodiment of the present invention, a method for the continuous buying and selling of securities, including receiving a plurality of active binding indications to trade securities at non-discrete prices from at least one institution, where each of the active binding indications to trade securities is a non-retail order to trade and the non-discrete prices are determined using national best bid and offer (NBBO) data; storing the plurality of active binding indications to trade securities; and executing at least one institution-to-institution trade defined by a first of the plurality of active binding indications to trade securities and a second of the plurality of active binding indications to trade securities immediately upon receipt of the second of the plurality of active binding indications to trade securities, if the second of the plurality of active binding indications to trade securities is on an opposite side of the first of the plurality of active binding indications to trade securities and the first and second of the plurality of active binding indications to trade securities are from different institutions, wherein the at least one institution-to-institution trade is executed so that each of the first and second active binding indications to trade are anonymous as to a source of each indication and also invisible to all other market participants. The method further includes receiving at least one binding order to trade securities from at least one source of binding orders, wherein each of the at least one binding order to trade is a retail marketable order; executing at least one institution-to-retail trade defined by one of the plurality of active binding indications to trade securities and an opposite side binding order to trade securities immediately upon receipt of the opposite side binding order to trade securities, wherein the at least one institution-to-retail trade is executed so that the first active binding indication to trade and the one of the at least one binding order to trade are anonymous as to a source of each and also invisible to all other market participants; and executing any unexecuted binding orders to trade securities as one of an exchange, a market maker, an electronic communications network (ECN), an alternative trading system (ATS), and an other market center by acting as a principal, an agent or a riskless principal.

In another embodiment of the present invention, a method for the continuous buying and selling of securities includes receiving an active first-entity binding indication to trade a security at non-discrete prices, where each of the active binding indications to trade securities is a non-retail order to trade; storing the active first-entity binding indication to trade the security; executing a trade defined by the active first-entity binding indication to trade the security and an active second-entity binding indication to trade the security immediately upon receipt of the active second-entity binding indication to trade the security, if the active second-entity binding indication to trade is on an opposite side of the active first-entity binding indication to trade; and executing a trade defined by the active first-entity binding indication to trade the security and a third-entity binding order to trade the security immediately upon receipt of the third-entity binding order to trade the security, if the active first-entity binding indication to trade the security is on an opposite side of the third-entity binding order to trade the security.

In another embodiment of the present invention, an article of manufacture comprising a computer-readable medium having stored thereon instructions adapted to be executed by a processor, the instructions which, when executed, define a series of steps to perform the continuous buying and selling of securities, the steps including receiving an active first-entity binding indication to trade a security at non-discrete prices, where each of the active binding indications to trade securities is a non-retail order to trade; storing the active first-entity binding indication to trade the security; executing a trade defined by the active first-entity binding indication to trade the security and an active second-entity binding indication to trade the security immediately upon receipt of the active second-entity binding indication to trade the security, if the active second-entity binding indication to trade is on an opposite side of the active first-entity binding indication to trade; and executing a trade defined by the active first-entity binding indication to trade the security and a third-entity binding order to trade the security immediately upon receipt of the third-entity binding order to trade the security, if the active first-entity binding indication to trade the security is on an opposite side of the third-entity binding order to trade the security.

In another embodiment of the present invention, a method for the continuous buying and selling of securities includes receiving at least one active first-entity binding indication to trade securities at non-discrete prices each of the active binding indications to trade securities is a non-retail order to trade; storing the at least one active first-entity binding indication to trade securities; transmitting information on the at least one active first-entity binding indication to trade securities at non-discrete prices to be used to determine if a third-entity binding order to trade a security is on an opposite side of at least one of the at least one active first-entity binding indication to trade the security; and executing a trade defined by the at least one of the at least one active first-entity binding indication to trade the security and the third-entity binding order to trade the security immediately upon receipt of the third-entity binding order to trade the security, if the at least one of the at least one active first-entity binding indication to trade the security is on an opposite side of the third-entity binding order to trade the security.

In another embodiment of the present invention, an article of manufacture comprising a computer-readable medium having stored thereon instructions adapted to be executed by a processor, the instructions which, when executed, define a series of steps to perform the continuous buying and selling of securities, the steps including receiving at least one active first-entity binding indication to trade securities at non-discrete prices each of the active binding indications to trade securities is a non-retail order to trade; storing the at least one active first-entity binding indication to trade securities; transmitting information on the at least one active first-entity binding indication to trade securities at non-discrete prices to be used to determine if a third-entity binding order to trade a security is on an opposite side of at least one of the at least one active first-entity binding indication to trade the security; and executing a trade defined by the at least one of the at least one active first-entity binding indication to trade the security and the third-entity binding order to trade the security immediately upon receipt of the third-entity binding order to trade the security, if the at least one of the at least one active first-entity binding indication to trade the security is on an opposite side of the third-entity binding order to trade the security.

In another embodiment of the present invention, a system that facilitates the continuous interaction of marketable orders at non-discrete prices includes a match box component; a financial information exchange (FIX) middleware component connected to the match box component; a marketpoint FIX engine component connected to the FIX middleware converter component and the marketpoint FIX engine component includes at least one external communication port; a DOR proxy component connected to the match box component and the DOR proxy includes at least one external communication port; a data warehouser component connected to the match box component; a clearing and settlement system component connected to the data warehouser component; a trade report scanner component connected to the match box component; a quote feed parser component connected to the match box component; and a monitor graphical user interface (GUI) connected to the match box component.

In another embodiment of the present invention, a system that facilitates the continuous interaction of marketable orders at non-discrete prices, the apparatus including a match box component; a financial information exchange (FIX) middleware component connected to the match box component; a marketpoint FIX engine component connected to the FIX middleware converter component and the marketpoint FIX engine component includes at least one external communication port; a DOR proxy component connected to the match box component and the DOR proxy includes at least one external communication port; a data warehouser component connected to the match box component; a clearing and settlement system component connected to the data warehouser component; a trade report scanner component connected to the match box component; a quote feed parser component connected to the match box component; and a monitor graphical user interface (GUI) connected to the match box component.

In another embodiment of the present invention, a DOR to facilitate the continuous interaction of retail and institutional marketable orders at non-discrete prices, which includes a DOR client component to receive marketable retail orders for at least one security and a DOR server component connected to the DOR client component. The DOR server component operates to receive a listing of marketable institutional orders for at least one security; compare the received listing of marketable institutional orders with incoming marketable retail orders; transmit a query requesting at least one instruction, if a matching marketable institutional order and marketable retail order are found; receive the requested at least one instruction; and route the matched marketable retail order according to the received at least one instruction.

In another embodiment of the present invention, a crossing network that facilitates the continuous interaction of marketable retail orders with professional trading interest at non-discrete prices, includes at least one dynamic order router (DOR) to receive and forward at least one retail order for at least one first instrument representing either a buy order or a sell order for each of the at least one first instrument; at least one institutional interface (II) to transmit at least one institutional order indication for at least one second instrument representing either a buy order or a sell order for each of the at least one second instrument; and a central order-match box (COMB) connected to each of the at least one DOR and at least one II over a communications network. The COMB includes a receiving subsystem to communicate with the at least one DOR and at least one II; a data subsystem to maintain a listing of the institutional order indications; and a matching subsystem to match and execute orders on opposite sides for each of the at least one first instrument.

In another embodiment of the present invention, a computer system which facilitates the continuous interaction of institutional and retail marketable orders at non-discrete prices, includes a processor system; a random access memory (RAM) connected to the processor system; a mass memory storage unit connected to the processor system; a communication system connected to the processor system; and an article of manufacture comprising a computer-readable medium having stored thereon instructions adapted to be executed by a processor, the instructions which, when executed, define a series of steps to perform the continuous buying and selling of securities. The steps include receiving at least one binding indication to trade at least one security at non-discrete prices from at least one institution; storing each of the at least one active binding indications to trade at least one security; executing a first trade defined by a first of the at least one active binding indication to trade one of the at least one security and a second of the at least one active binding indication to trade the one of the at least one security immediately upon receipt of the second of the at least one active binding indication to trade, if the second of the at least one active binding indication to trade is on an opposite side from the first of the at least one active binding indication to trade, the security and the first and second of the at least one active binding indications to trade the one of the at least one security are from different institutions, wherein the first trade is executed so that each of the first and second active binding indications to trade are anonymous as to a source of each indication and also invisible to all other market participants; transmitting information on the at least one active binding indication to trade at least one security at non-discrete prices to at least one source of binding orders; and executing a second trade defined by one of the at least one active binding indication to trade the one of the at least one security and a binding order to trade the one of the at least one security immediately upon receipt of the binding order to trade the one of the at least one security, if the active binding indication to trade the one of the at least one security is on an opposite side from the binding order to trade the one of the at least one security, wherein the second trade is executed so that the one of the at least one active binding indication to trade the one of the at least one security and the binding order to trade the one of the at least one security are anonymous as to the source of the active binding indication to trade and a source of the binding order and also invisible to the other market participants.

The above embodiments are merely illustrative of the numerous possible embodiments and therefore should not be construed so as to limit the scope of the invention. Therefore, it should be understood that while the present invention has been described mainly in terms of a centralized COMB system, those skilled in the art would recognize that the principles of the invention can be used advantageously with alternative embodiments involving, for example, distributed systems as well. Accordingly, all such implementations, which fall within the spirit and the broad scope of the appended claims, will be embraced by the principles of the present invention.

What is claimed is:

1. An automated trading system comprising:
a processor;
a memory storing instructions adapted to be executed by said processor to:
    receive at said automated trading system an active first-entity binding indication to trade a security at non-discrete prices, said active first-entity binding indication to trade a security being a non-retail order to trade primarily against retail orders;
    store said active first-entity binding indication to trade said security; and
    execute a trade defined by said active first-entity binding indication to trade said security and a second-entity binding order to trade said security immediately upon receipt of said second-entity binding order to trade said security, said second-entity binding order to trade said security being a retail marketable order, if said active first-entity binding indication to trade said security is on an opposite side of said second-entity binding order to trade said security, said first-entity binding indication to trade and said second-entity binding order to trade being invisible to other market participants and a source of said first-entity binding indication and a source of said second-entity binding order to trade being anonymous to each other.

2. The automated trading system of claim 1, wherein the trade defined by said active first-entity binding indication and said second-entity binding order to trade said security is executed by a sponsor acting as an agent or as a riskless principal.

3. The automated trading system of claim 2, wherein said sponsor is a registered broker dealer that serves as a counterparty for the trade, so that the identities of the sources of the active first-entity binding indication and the second-entity binding order to trade said security are anonymous to each other before, during and after a clearance and settlement process.

4. The automated trading system of claim 2, wherein said sponsor is a source of one or more of said active first-entity binding indication to trade and of said second-entity binding order to trade.

5. The automated trading system of claim 1, wherein said active first-entity binding indication to trade comprises:
    a trading symbol representing said security;
    a side for said trade of said security, wherein said side is defined as either a buy or a sell; and
    a quantity representing a number of shares of said security to be traded.

6. The automated trading system of claim 5, wherein said active first-entity binding indication to trade further comprises:
    a price limit.

7. The automated trading system of claim 1, wherein said second-entity binding order to trade comprises at least:
    a trading symbol representing said security;
    a side for said trade of said security;
    a quantity representing a number of shares of said security to be traded; and
    an order type selected from at least a post-open market order and a marketable limit order.

8. The automated trading system of claim 1, wherein said active first-entity binding indication to trade and said second-entity binding order to trade are invisible to other market participants such that neither said active first-entity binding indication to trade nor said second-entity binding order to trade are displayed on any terminal or in any quotation.

9. The automated trading system of claim 1, wherein said active first-entity binding indication to trade is alternatively a non-retail order to trade only against retail orders.

10. The automated trading system of claim 1, further comprising instructions adapted to be executed by said processor to:
    receive an active second-entity binding non-retail indication to trade said security at non-discrete prices;
    determine whether said active second-entity binding non-retail indication to trade said security is on an opposite side of said active first-entity binding non-retail indication to trade said security; and
    execute a trade defined by said active first-entity binding non-retail indication to trade said security and said active second-entity binding non-retail indication to trade said security, if said active second-entity binding non-retail indication to trade said security is on an opposite side of said active first-entity binding non-retail indication to trade said security, said trade being executed so that said source of said active first-entity binding non-retail indication to trade said security and a source of said active second-entity binding non-retail indication to trade said security are anonymous to each other.

11. The automated trading system of claim 1, further comprising instructions adapted to be executed by said processor to at least one of:
    return said binding retail order to trade said security to said source of said binding retail order to trade said security, if said binding retail order to trade said security is unexecuted against said active first-entity binding non-retail indication to trade said security;
    transmit said binding retail order to trade said security to one of an exchange, a market-maker, an electronic communications network (ECN), an alternative trading system (ATS), and any other market center, if said binding retail order to trade said security is unexecuted against said active first-entity binding non-retail indication to trade said security;
    transmit said binding retail order to trade said security to an order routing service bureau or similar entity for routing to an exchange, a market-maker, an electronic communications network (ECN), an alternative trading system (ATS), or any other market center, if said binding retail order to trade said security is unexecuted against said active first-entity binding non-retail indication to trade said security; and
    execute said binding retail order to trade said security as one of an exchange, a market maker, an electronic communications network (ECN), an alternative trading system (ATS), and another market center by acting as principal, an agent, or a riskless principal, if said binding retail order to trade said security is unexecuted against said active first-entity binding non-retail indication to trade said security.

12. An automated trading system comprising:
a processor;
a memory storing instructions adapted to be executed by said processor to:
receive an active binding non-retail indication to trade a security primarily against retail orders;
receive a binding retail order to trade said security, said binding retail order to trade said security being a marketable order;
determine whether said binding retail order to trade said security is on an opposite side of said active binding non-retail indication to trade said security; and
execute a trade defined by said active binding non-retail indication to trade said security and said binding retail order to trade said security, if said binding retail order to trade said security is on an opposite side of said active binding non-retail indication to trade said security, said trade being executed so that a source of said active binding non-retail indication to trade said security and a source of said binding retail order to trade are anonymous to each other.

13. The automated trading system of claim 12, wherein said active binding non-retail indication is a non-retail order to trade at a passively determined price.

14. The automated trading system of claim 12, wherein said active binding non-retail indication and said binding retail order are invisible to other market participants.

15. The automated trading system of claim 12, wherein the trade defined by said active binding non-retail indication and said binding retail order to trade said security is executed by a sponsor acting as an agent or as a riskless principal.

16. The automated trading system of claim 12, wherein said instructions to receive an active binding non-retail indication to trade said security comprises instructions to:
receive said active binding non-retail indication to trade said security at non-discrete prices.

17. The automated trading system of claim 12, further comprising instructions adapted to be executed by said processor to:
receive a second active binding non-retail indication to trade said security at non-discrete prices;
determine whether said second active binding non-retail indication to trade said security is on an opposite side of said active binding non-retail indication to trade said security; and
execute a trade defined by said active binding non-retail indication to trade said security and said second active binding non-retail indication to trade said security, if said second active binding non-retail indication to trade said security is on an opposite side of said active binding non-retail indication to trade said security, said trade being executed so that said source of said active binding non-retail indication to trade said security and a source of said second active binding non-retail indication to trade said security are anonymous to each other.

18. The automated trading system of claim 12, further comprising instructions adapted to be executed by said processor to at least one of:
return said binding retail order to trade said security to said source of said binding retail order to trade said security, if said binding retail order to trade said security is unexecuted against said active binding non-retail indication to trade said security;
transmit said binding retail order to trade said security to one of an exchange, a market-maker, an electronic communications network (LCN), an alternative trading system (ATS), and any other market center, if said binding retail order to trade said security is unexecuted against said active binding non-retail indication to trade said security;
transmit said binding retail order to trade said security to an order routing service bureau or similar entity for routing to an exchange, a market-maker, an electronic communications network (LCN), an alternative trading system (ATS), or any other market center, if said binding retail order to trade said security is unexecuted against said active binding non-retail indication to trade said security; and
execute said binding retail order to trade said security as one of an exchange, a market maker, an electronic communications network (LCN), an alternative trading system (ATS), and another market center by acting as principal, an agent, or a riskless principal, if said binding retail order to trade said security is unexecuted against said active binding non-retail indication to trade said security.

19. The automated trading system of claim 12, wherein said active binding non-retail indication to trade is alternatively a non-retail order to trade only against retail orders.

20. An automated trading system comprising:
a processor;
a memory storing instructions adapted to be executed by said processor to:
receive a first active binding indication to trade a security at a non-discrete price from at least one institution, said first active binding indication to trade is said security being a non-retail order to trade primarily against retail orders and said non-discrete price being determined using national best bid and offer (NBBO) data;
store said first active binding indication to trade said security;
transmit information on said first active binding indication to trade said security at non-discrete prices to a source of binding orders;
receive as a result of said transmitted information a query from said source of binding orders to request an instruction regarding a binding order to trade said security, said binding order to trade being a retail marketable order;
transmit said instruction to said one source of binding orders, said instruction being to transmit said binding order to trade said security, if said binding order is an opposite side binding order to trade said security which is on an opposite side of said first active binding indication to trade said security, or to decline said binding order to trade said security;
receive at said automated trading system said opposite side binding order to trade said security from said source of binding orders, if said instruction was to transmit said opposite side binding order to trade said security; and
execute at said automated trading system an institution-to-retail trade defined by said first active binding indication to trade said security and said opposite side binding order to trade said security immediately upon receipt of said opposite side binding order to trade said security, said institution-to-retail trade being executed so that said first active binding indication to trade and said opposite side binding order to trade are invisible to other market participants and said at least one institution and said source of binding orders are anonymous to each other.

21. The automated trading system of claim 20, wherein said instruction to transmit said binding order to trade comprises: directly routing said binding order to trade.

22. The automated trading system of claim 20, wherein said instruction to transmit said binding order to trade comprises: tagging said binding order to trade to be subsequently routed by a primary order routing system; and forwarding said tagged binding order to trade to said primary order routing system to be routed.

23. The automated trading system of claim 20, wherein said active first-entity binding indication to trade is alternatively a non-retail order to trade only against said retail orders.

24. The automated trading system of claim 20, further comprising instructions adapted to be executed by said processor to:
execute an institution-to-institution trade defined by said first active binding indication to trade said security and a second active binding indication to trade said security immediately upon receipt of said second active binding indication to trade said security, if said second active binding indication to trade said security is on an opposite side of said first active binding indication to trade said security and said first and second active binding indications to trade said security are from different institutions, wherein said institution-to-institution trade is executed so that each of said first and second active binding indications to trade said security are invisible to other market participants and said different institutions are anonymous to each other.

25. An automated trading system comprising:
a processor;
a memory storing instructions adapted to be executed by said processor to:
receive a first active binding indication to trade a security at a non-discrete price from an institution, said first active binding indication to trade said security being a non-retail order to trade primarily against retail orders and said non-discrete price being determined using a passive pricing mechanism;
store said first active binding indication to trade said security;
transmit information on said first active binding indication to trade said security to a source of binding orders;
receive a binding order to trade said security from said source of binding orders as a result of said transmitted information, if said binding order to trade said security is on an opposite side of said first active binding indication to trade said security, said binding order to trade said security being a retail marketable order; and
execute an institution-to-retail trade defined by said first active binding indication to trade said security and said binding order to trade said security immediately upon receipt of said binding order to trade said security, said institution-to-retail trade being executed so that said first active binding indication to trade and said binding order to trade are invisible to other market participants and said institution and said source of binding orders are anonymous to each other.

26. The automated trading system of claim 25, wherein said instructions to receive a binding order to trade said security comprises instructions to:
receive at least one query from said source of binding orders to request an instruction regarding a binding order to trade said security, said binding order to trade being a retail marketable order;
transmit said instruction regarding a binding order to said source of binding orders, said instruction being to transmit said binding order to trade said security, if said binding order to trade said security is said opposite side binding order to trade said security, which is on an opposite side of said first active binding indication to trade said security; and
receive said opposite side binding order to trade said security from said source of binding orders, if said instruction was to transmit said opposite side binding order to trade said security.

27. The automated trading system of claim 25, wherein said first active binding indication to trade is alternatively a non-retail order to trade only against retail orders.

28. An automated trading system comprising:
a processor;
a memory storing instructions adapted to be executed by said processor to:
receive a first active binding indication to trade a security at non-discrete prices from at least one institution, said first active binding indication to trade said security being a non-retail order to trade primarily against retail orders and said non-discrete prices being determined using national best bid and offer (NBBO) data;
store said first active binding indication to trade said security;
transmit information regarding said first active binding indication to trade said security to a module integrated into the internal systems of a source of binding orders, said module to dynamically monitor said binding orders prior to their routing to one or more market centers for execution and said binding orders being retail orders to trade;
receive an opposite-side binding order to trade said security from said source of binding orders, said opposite-side binding order being an order to trade said security which is on an opposite side of said first active binding indication to trade said security, said opposite side binding order to trade said security being identified by said module;
use said NBBO data to determine whether said opposite-side binding order to trade said security is a match-eligible binding order to trade said security, said match-eligible binding order being an opposite-side binding order to trade said security that is marketable; and
execute an institution-to-retail trade defined by said first active binding indication to trade said security and said opposite-side binding order to trade said security, if said opposite-side binding order is a match-eligible binding order to trade said security, said institution-to-retail trade being executed so that said first active binding indication to trade and said match-eligible binding order to trade are not displayed to other market participants and said at least one institution and said source of binding orders are anonymous to each other.

29. The automated trading system of claim 28, wherein the trade defined by said first active binding indication to trade and said match-eligible binding order to trade is executed by a system sponsor acting as an agent or as a riskless principal.

30. The automated trading system of claim 29, wherein said sponsor is a source of one or more of said first active binding indication to trade and of said match-eligible binding order to trade.

31. The automated trading system of claim 28, further comprising instructions adapted to be executed by said processor to:
execute, display, or route said opposite-side binding order to trade said security as one of an exchange, an ECN, an ATS, a market-maker, a dealer, or an order-routing system, if said opposite-side binding order is not a match-eligible binding order to trade said security.

32. The automated trading system of claim 28, wherein said first active binding indication to trade is alternatively a non-retail order to trade only against retail orders.

33. An automated trading system comprising:
a processor;
a memory storing instructions adapted to be executed by said processor to:
receive a first active binding indication to trade a security from a source of non-retail orders, said first active binding indication to trade said security being a non-retail order to trade primarily against retail orders;
store said first active binding indication to trade said security;
transmit information regarding said first active binding indication to trade said security to a module integrated into the internal systems of a source of binding orders, said module to dynamically monitor said binding orders prior to their routing to one or more market centers for execution and said binding orders being retail orders to trade;
receive an opposite-side binding order to trade said security from said source of binding orders, said opposite-side binding order being an order to trade said security which is on an opposite side of said first active binding indication to trade said security, said opposite side binding order to trade said security being identified by said module;
determine whether said opposite-side binding order to trade said security is a match-eligible binding order to trade said security, said match-eligible binding order being an opposite-side binding order to trade said security that is marketable;
execute a trade defined by said first active binding indication to trade said security and said opposite-side binding order to trade said security, if said opposite-side binding order is a match-eligible binding order to trade said security, said trade being executed so that said first active binding indication to trade and said match-eligible binding order to trade are not displayed to other market participants and said source of non-retail orders and said source of binding orders are anonymous to each other.

34. The automated trading system of claim 33, wherein the trade defined by said first active binding indication to trade and said match-eligible binding order to trade is executed by a system sponsor acting as an agent or as a riskless principal.

35. The automated trading system of claim 34, wherein said sponsor is a source of one or more of said first active binding indication to trade and of said match-eligible binding order to trade.

36. The automated trading system of claim 33, further comprising instructions adapted to be executed by said processor to:
execute, display, or route said opposite-side binding order to trade said security as one of an exchange, an ECN, an ATS, a market-maker, a dealer, or an order-routing system, if said opposite-side binding order is not a match-eligible binding order to trade said security.

37. The automated trading system of claim 33, wherein said first active binding indication to trade is alternatively a non-retail order to trade only against retail orders.

* * * * *

UNITED STATES PATENT AND TRADEMARK OFFICE
CERTIFICATE OF CORRECTION

PATENT NO.       : 7,627,516 B2                                       Page 1 of 1
APPLICATION NO. : 11/249495
DATED            : December 1, 2009
INVENTOR(S)      : Gianakouros et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this

Second Day of November, 2010

David J. Kappos
*Director of the United States Patent and Trademark Office*